United States Patent
Yamashita

(10) Patent No.: US 8,286,150 B2
(45) Date of Patent: Oct. 9, 2012

(54) MODULE GENERATING APPARATUS, MODULE GENERATING METHOD, AND COMPUTER PRODUCT

(75) Inventor: Koichiro Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 438 days.

(21) Appl. No.: 12/543,013

(22) Filed: Aug. 18, 2009

(65) Prior Publication Data
US 2009/0307672 A1   Dec. 10, 2009

Related U.S. Application Data

(63) Continuation of application No. PCT/JP2007/053676, filed on Feb. 27, 2007.

(51) Int. Cl.
*G06F 9/45* (2006.01)

(52) U.S. Cl. ......................... 717/141; 717/143; 717/146

(58) Field of Classification Search ........................ None
See application file for complete search history.

(56) References Cited

U.S. PATENT DOCUMENTS 6,546,553 B1 *  4/2003  Hunt ............................ 717/174
7,386,834 B2 *  6/2008  Van De Vanter et al. ..... 717/110

FOREIGN PATENT DOCUMENTS

| JP | 8-505721 | 6/1996 |
|----|----------|--------|
| JP | H8-505721 A | 6/1996 |
| WO | 94/15286 | 7/1994 |

OTHER PUBLICATIONS

Search Report and Written Opinion, mailed Mar. 27, 2007, in corresponding PCT Application No. PCT/JP2007/053676 (7 PP.).

* cited by examiner

*Primary Examiner* — Chuck Kendall
(74) *Attorney, Agent, or Firm* — Staas & Halsey LLP

(57) ABSTRACT

A computer is caused to function as a parsing unit, a macroblocking analyzing unit, a junction-node restructuring unit, an identical portion merging/restructuring unit, a similar portion merging/restructuring unit, and an intermediate language restructuring unit. The parsing unit performs syntax analysis of a source code. The macroblocking analyzing unit segments the program written in the source code into blocks and appends a virtual portion representing a unique number in a statement, to a number for identifying a variable for the statement in each block to virtualize a calculation pattern. The junction-node restructuring unit extracts a node directly related to a subroutine block. The identical portion merging/restructuring unit merges pre-processing together and post-processing together for a subroutine called up at a multiple portions in the program. The similar portion merging/restructuring unit integrates subroutines having similar structures into a related subroutine.

16 Claims, 17 Drawing Sheets

|   | PROCESS CLASSIFICATION | EXPRESSION IN SOURCE CODE |
|---|---|---|
| A | CALCULATION SUBSTITUTION PROCESS | USUAL EQUATION (SUBSTITUTION, CALCULATION) |
| B | LOOP | LOOP STRUCTURE |
| C | CONDITIONAL BRANCH | CONDITIONAL BRANCH |
| D | NONCONDITIONAL JUMP | SUBROUTINE CALL |

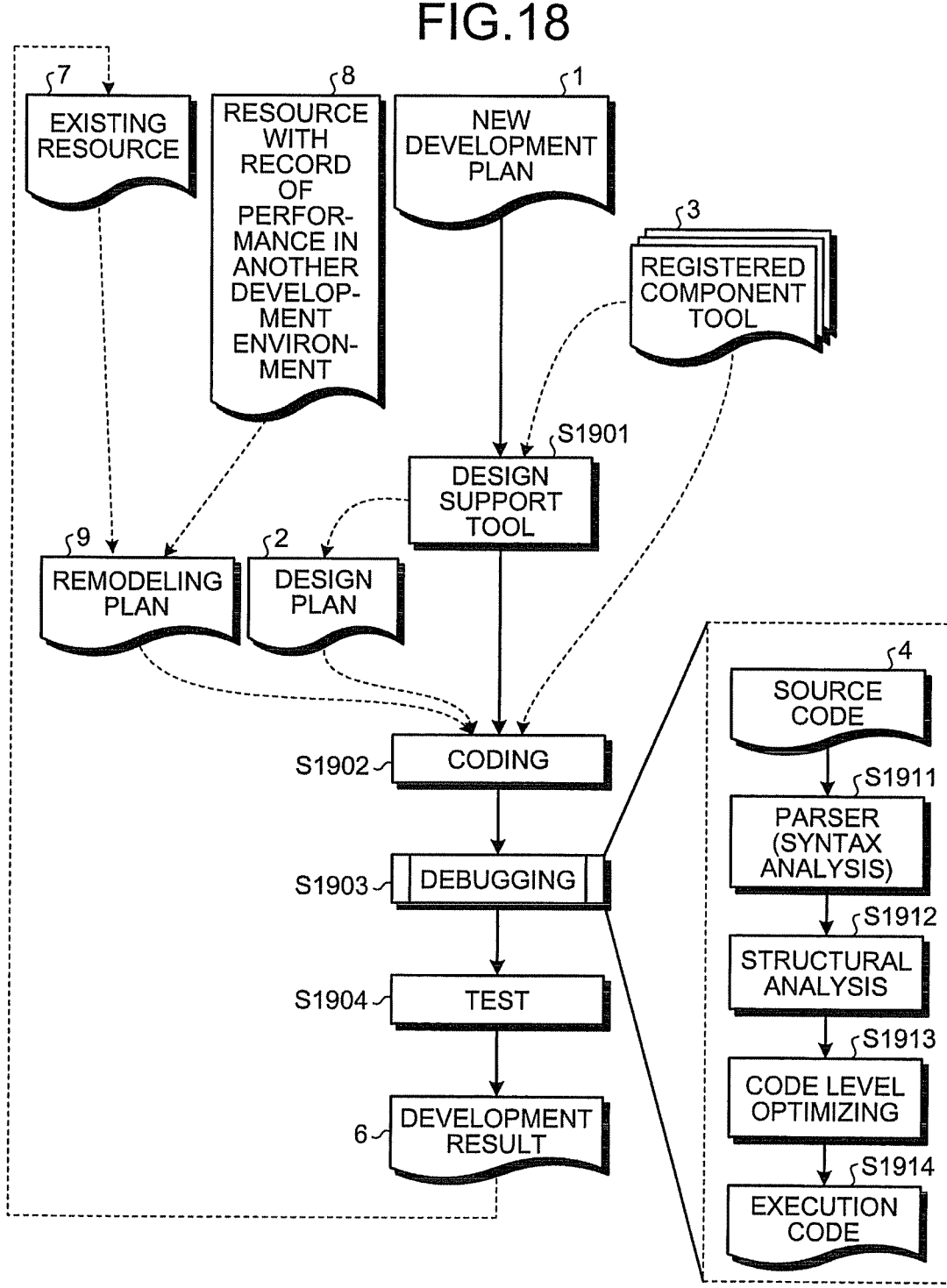

US 8,286,150 B2

MODULE GENERATING APPARATUS, MODULE GENERATING METHOD, AND COMPUTER PRODUCT

CROSS-REFERENCE TO RELATED APPLICATIONS

This is a continuation of International Application No. PCT/JP2007/053676, filed on Feb. 27, 2007, the entire contents of which are hereby incorporated by reference.

FIELD

The embodiment discussed herein is related to module generation.

BACKGROUND

FIG. 18 is a flowchart of a conventional software development process. As depicted in FIG. 18, when software is newly developed, a design plan 2 is first made from a new development plan 1 written in a natural language, using a design support tool (step S190). The new development plan 1 is compared with registered tools and components (registered tools/components) 3, and the registered tools/components 3 are combined to provide a combination of tools and components that match the new development plan 1.

Subsequently, a coding process is performed based on the design plan 2 (step S1902), and code resulting from the coding is subjected to a debugging process (step S1903). In the debugging process, a parsing process of analyzing the syntax of source code 4 (step S1911), a structure analyzing process of analyzing the structure of the source code 4 (step S1912), and a code level optimizing process of deleting redundant code, etc., (step S1913) are performed to generate execution code 5.

In the optimizing process, known processes such as constant propagation, inline expansion, and loop unrolling are executed. The structure of the program, however, is not changed. Part of the coding process and debugging process is executed manually by a software developer. Manual execution of the process means that the process is not automatically executed by a computer working as a design support tool, etc., but is executed by the developer through confirmation by trial and error.

Following the debugging process, a test using the execution code 5 is performed (step S1904) to obtain a development result 6, which is reused as an existing resource 7. When this existing resource 7 and a resource 8 with a performance record in another development environment are reused, if the resources 7 and 8 are subject to a specification change, the software developer needs to manually create a modification plan 9.

An object-oriented framework system is known that provides the first object-oriented operating system using innovative framework architecture. An apparatus that provides this object-oriented framework system includes an operating system unit that processes an object-oriented application program, and a framework processing unit that standardizes an object-oriented application program residing in the operating system unit (e.g., Japanese Laid-Open Patent Publication No. 08-505721).

In the above conventional software development process, a developer manually analyzes given source code and documents to make a modification plan when an existing resource is remodeled by reusing a resource with a performance record in another development environment. This brings about the following problem. First, the result of manual analysis may include an error. In addition, when the existing resource and the resource with a performance record are processed into a module and have common portions, the developer may not be able to sufficiently extract the common portions. If extraction of the common portion is insufficient, new portions in the resource with a performance record in another development environment becomes greater in number, which results in an increase in trouble and time spent for debugging and testing of the new portions. Additionally, the object-oriented framework system disclosed in the above patent document does not automatically generate a reusable module from an existing resource.

SUMMARY

According to an aspect of an embodiment, a module generating apparatus includes a parsing unit that performs syntax analysis of a source code for a program and outputs information concerning the syntax analysis; a macroblocking analyzing unit that based on syntax analysis information output from the parsing unit, segments the program into a plurality of blocks through structural analysis of the program and outputs block structure information obtained as a result of the segmentation and appendant information for virtualizing a calculation pattern of each block; a junction-node restructuring unit that based on the block structure information and the appendant information output from the macroblocking analyzing unit, focuses on one block, defined as a subroutine, extracts a node directly related to the block of focus by tracing back a processing sequence to a node that is in an ancestor block upstream in the processing sequence from the block of focus and from which the block of focus is reached as a result of sequential processing, and by tracing the processing sequence to a node that is in a descendant block downstream in the processing sequence from the block of focus and that is processed after the block of focus; an identical portion merging/restructuring unit that, with respect to a plurality of portions that use the block of focus extracted from the program by the junction-node restructuring unit, compares nodes in ancestor blocks of the block of focus to merge the ancestor blocks, compares nodes in descendant blocks of the block of focus to merge the descendant blocks, and outputs merged-block information obtained as a result of merging the ancestor blocks and merging the descendant blocks; a similar portion merging/restructuring unit that with respect to a second block of focus extracted from the program by the junction-node restructuring unit, compares the merged-block information to define, as subroutines of an identical type, a plurality of blocks of focus that have similar or identical merged block information, further merges similar or identical merged block information, and outputs abstracted code information obtained as a result of the merging; and an intermediate language restructuring unit that outputs information of a commonized component, based on the abstracted code information and the syntax analysis information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a flowchart of a conventional software development process.

DESCRIPTION OF EMBODIMENTS

Embodiments will be explained with reference to the accompanying drawings.

Figure 1:
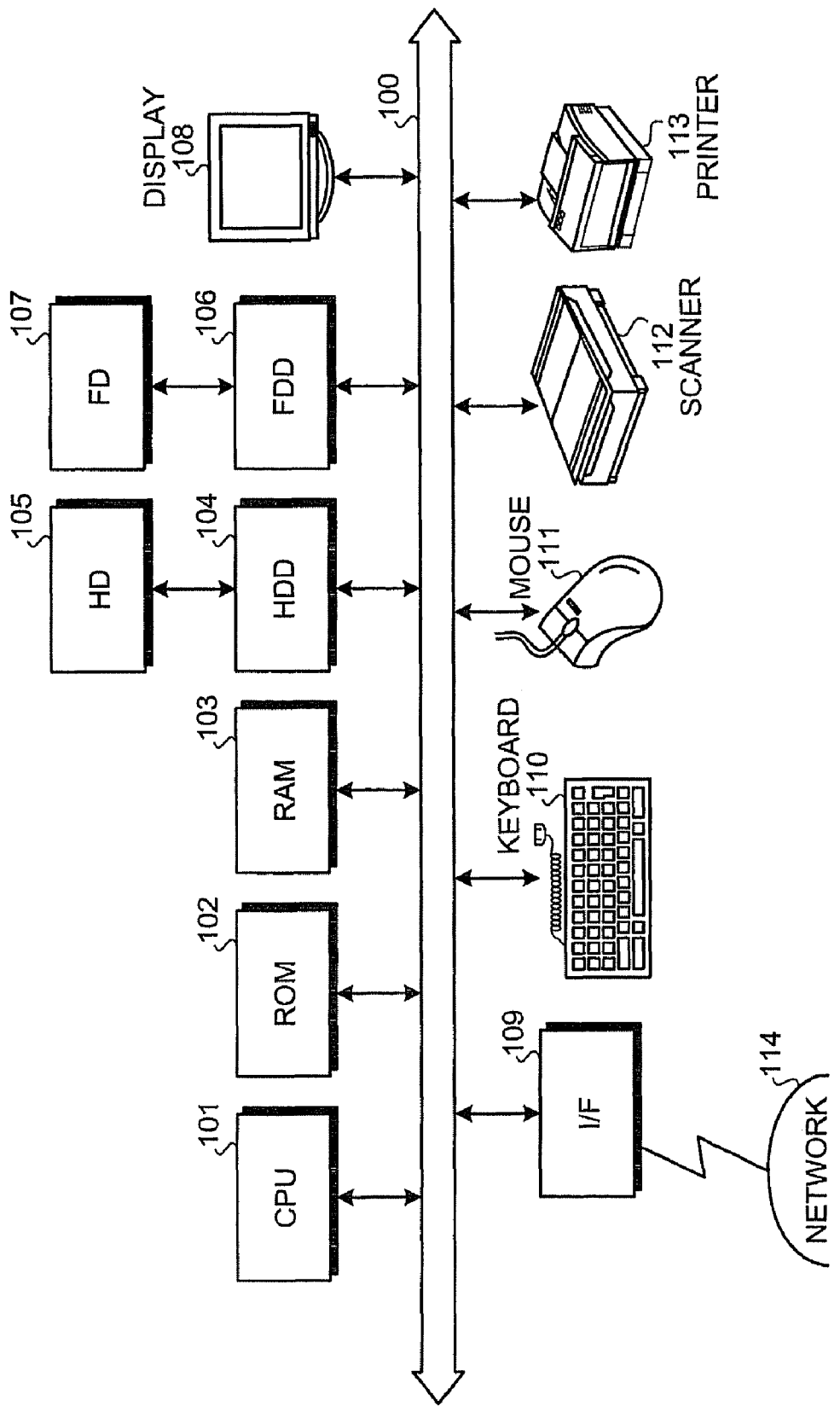
FIG. 1 is a block diagram of a hardware configuration of a module generating apparatus according to an embodiment.

FIG. 1 is a block diagram of a hardware configuration of a module generating apparatus according to an embodiment. As depicted in FIG. 1, the module generating apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107 as an example of a removal recording medium, a display 108, an interface (I/F) 109, a keyboard 110, a mouse 111, a scanner 112, and a printer 113, connected to one another by way of a bus 100.

The CPU 101 governs overall control of the module generating apparatus. The ROM 102 stores therein programs such as a boot program. The RAM 103 is used as a work area of the CPU 101. The HDD 104, under the control of the CPU 101, controls the reading and writing of data with respect to the HD 105. The HD 105 stores therein the data written under control of the HDD 104.

The FDD 106, under the control of the CPU 101, controls the reading and writing of data with respect to the FD 107. The FD 107 stores therein the data written under control of the FDD 106, the data being read by the module generating apparatus.

In addition to the FD 107, a removable recording medium may include a compact disk read-only memory (CD-ROM), compact disk-recordable (CD-R), a compact disk-rewritable (CD-RW), a magneto optical disk (MO), a Digital Versatile Disk (DVD), or a memory card. The display 108 displays a cursor, an icon, a tool box, and data such as document, image, and function information. The display 108 may be, for example, a cathode ray tube (CRT), a thin-film-transistor (TFT) liquid crystal display, or a plasma display.

The I/F 109 is connected to a network 114 such as the Internet through a telecommunications line and is connected to other devices by way of the network 114. The I/F 109 administers an internal interface with the network 114, and controls the input and output of data with respect to external devices. The I/F 109 may be, for example, a modem or a local area network (LAN) adapter.

The keyboard 110 is equipped with keys for the input of characters, numerals, and various instructions, and data is entered through the keyboard 110. The keyboard 110 may be a touch-panel input pad or a numeric keypad. The mouse 111 performs cursor movement, range selection, and movement, size change, etc., of a window. The mouse 111 may be a trackball or a joystick provided the trackball or joystick has similar functions as a pointing device.

The scanner 112 optically reads an image and takes in the image data into the module generating apparatus. The scanner 112 may have an optical character recognition (OCR) function. The printer 113 prints image data and document data. The printer 113 may be, for example, a laser printer or an ink jet printer.

Figure 2:
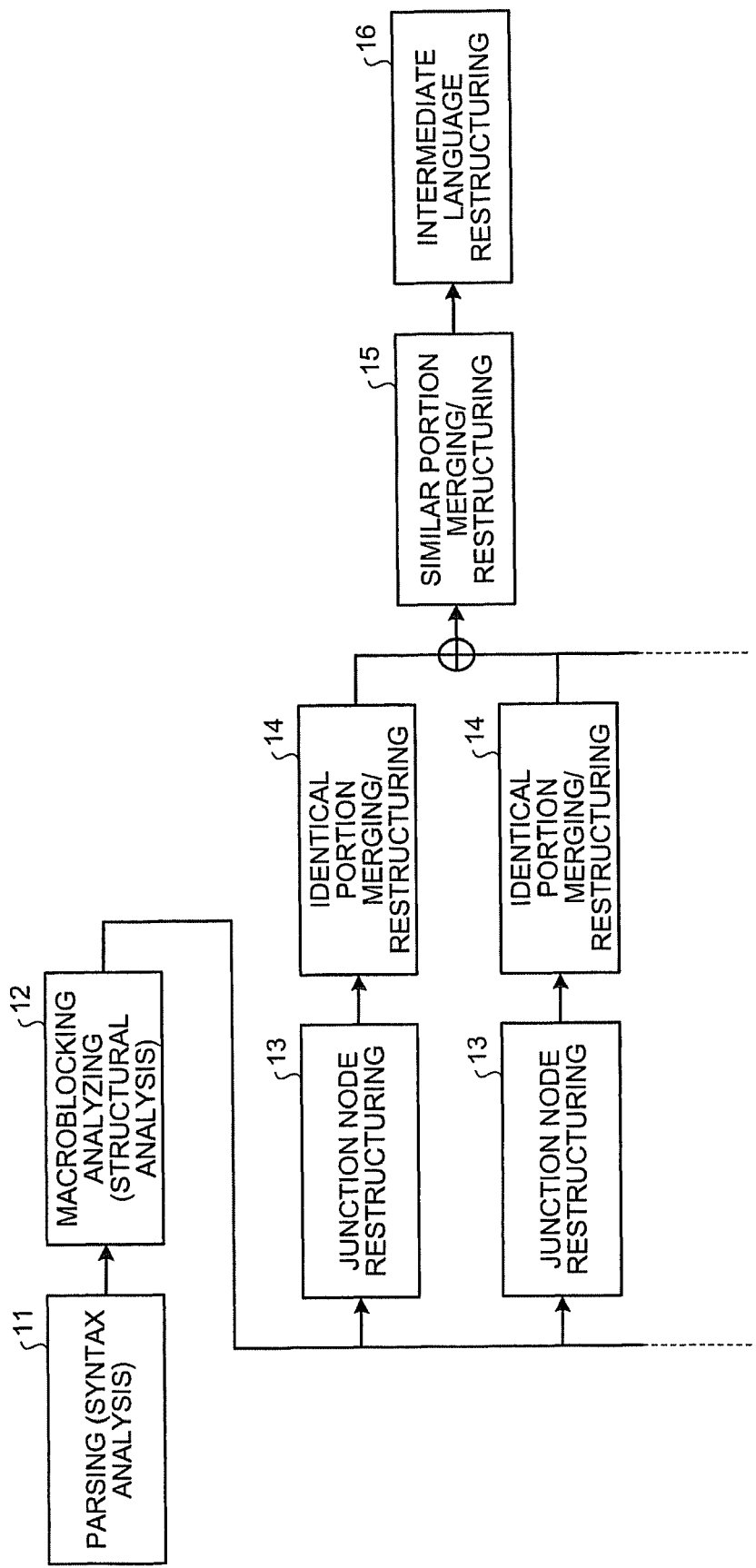
FIG. 2 is a functional diagram of a module generating apparatus according to the embodiment.

FIG. 2 is a functional diagram of a module generating apparatus according to the embodiment. As depicted in FIG. 2, the module generating apparatus includes a parsing unit 11, a macroblocking analyzing unit 12, a junction-node restructuring unit 13, an identical portion merging/restructuring unit 14, a similar portion merging/restructuring unit 15, and an intermediate language restructuring unit 16.

The parsing unit 11 performs syntax analysis of a source code for a program. The macroblocking analyzing unit 12 performs structural analysis of the program to segment the program into blocks. The macroblocking analyzing unit 12 appends a virtual portion to a number for identifying a variable for a statement in each segmented block, the virtual portion representing a number unique in the statement and appended to extend the number for identifying the variable for the statement.

For example, the macroblocking analyzing unit 12 determines a conventionally appended number unique in the entire source code to be a lower bit portion and appends the above virtual portion as an upper bit portion of the lower bit portion. Through this number extension, a number for identifying a statement variable is expressed by a combination of a lower portion and an upper portion, so that a calculation pattern in each block is virtualized.

The junction-node restructuring unit 13 focuses on one block defined as a subroutine and searches nodes in an ancestor block of the block of focus in a reverse direction to extract, as a node directly related to the block, a node reached by tracing a single route from the block of focus.

The junction-node restructuring unit 13 searches nodes in a descendant block of the block of focus in the forward direction to extract a node continuing a process by the block of focus and, if a node further continuing a process by the successor node is present, further extracts such a node. In this manner, the junction-node restructuring unit 13 extracts a successive chain of nodes in the forward direction from the block of focus, as nodes related directly to the block of focus.

When extracting a node, the junction-node restructuring unit 13 masks the upper portion (virtual portion) of a number for identifying a statement variable and refers only to the lower portion of the number. The identical portion merging/restructuring unit 14 compares nodes in ancestor blocks of multiple portions in the program where the block of focus is called up, to merge similar or identical ancestor blocks together.

In the same manner, the identical portion merging/restructuring unit 14 compares nodes in descendant blocks to merge similar or identical descendant blocks together. When determining the identicalness of nodes, the identical portion merging/restructuring unit 14 masks the lower portion of a number for identifying a statement variable and refers only to the upper portion (virtual portion) of the number.

The similar portion merging/restructuring unit 15 defines subroutine blocks of similar structures present in the entire program as subroutines of the same type. The similar portion merging/restructuring unit 15, with respect to the subroutine blocks defined as subroutines of the same type, then merges ancestor blocks together and descendant blocks together in the same manner as the identical portion merging/restructuring unit 14 merges blocks.

When determining the similarity of nodes in subroutines of the same type, the similar portion merging/restructuring unit 15 masks the lower portion of a number for identifying a statement variable and refers only to the upper portion (virtual portion) of the number. The intermediate language restructuring unit 16 outputs information concerning componentized source code and a commonized component, based on output information from the similar portion merging/restructuring unit 15.

In the configuration example of FIG. 2, pairs of the junction-node restructuring units 13 and the identical portion merging/restructuring units 14 are provided so that information output from each of the pairs is integrated and passed to the similar portion merging/restructuring unit 15. In other words, processes are performed according to the structure of source code input to the parsing unit 11.

Respective functions of the parsing unit 11, the macroblocking analyzing unit 12, the junction-node restructuring unit 13, the identical portion merging/restructuring unit 14, the similar portion merging/restructuring unit 15, and the intermediate language restructuring unit 16, are implemented, for example, by the CPU 101 executing a program recorded on a recording medium such as the ROM 102, the RAM 103, and the HD 105 of FIG. 1 or by the I/F 109.

Figure 3:
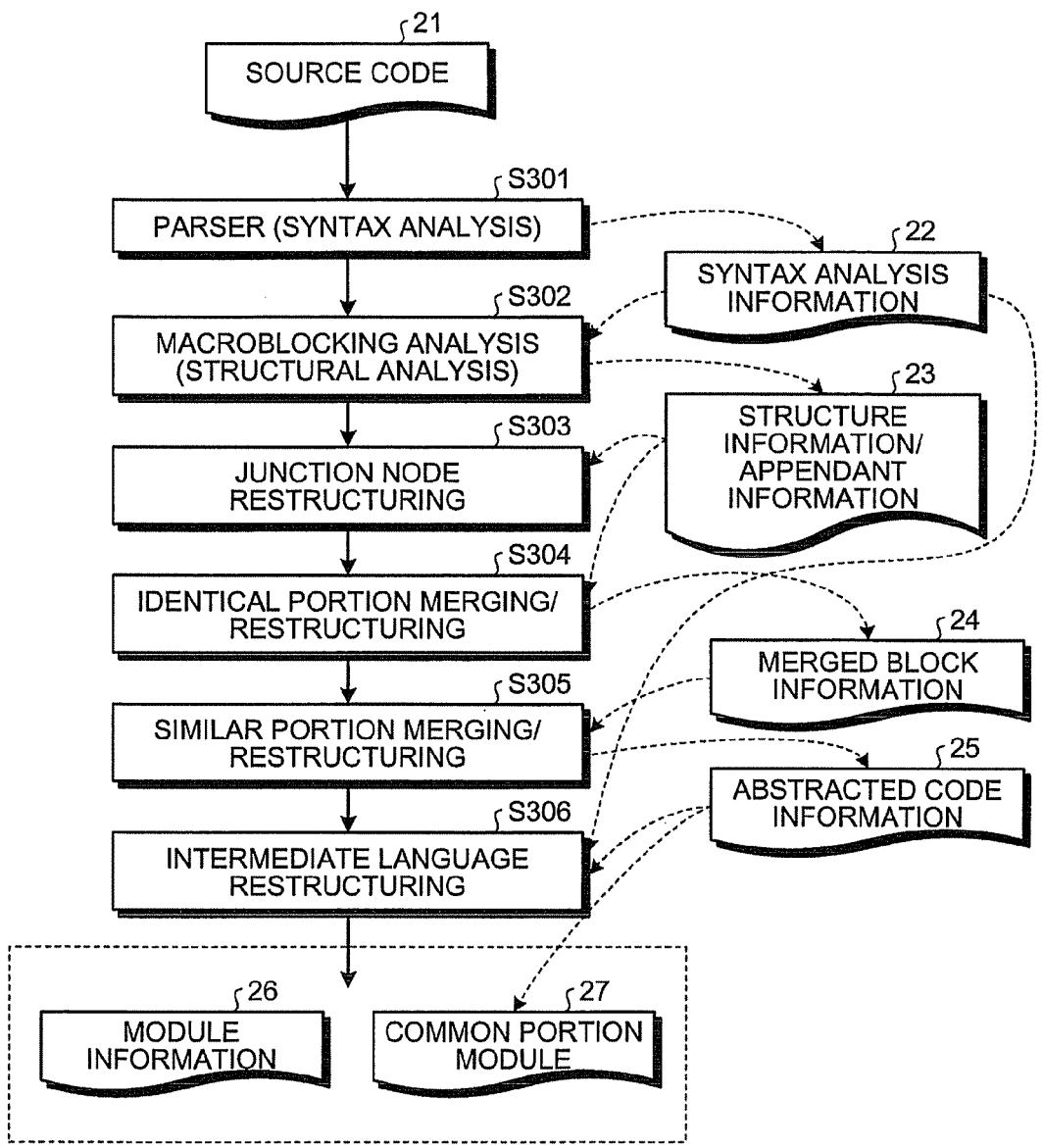
FIG. 3 is a flowchart of a module generating process according to the embodiment.

FIG. 3 is a flowchart of a module generating process according to the embodiment. As depicted in FIG. 3, when a source code 21 is input to the parsing unit 11 to start the module generating process, the parsing unit 11 executes parsing (syntax analysis) (step S301) that is equivalent to an initial phase in the configuration of an ordinary compiler. Through this parsing, syntax analysis information 22 is obtained as intermediately generated information.

Subsequently, the macroblocking analyzing unit 12 performs a macroblocking analysis (structural analysis), based on the syntax analysis information 22 (step S302). Through this macroblocking analysis, structural information/appendant information 23 is obtained as intermediately generated information. The junction-node restructuring unit 13 then performs a junction node restructuring step, based on the structural information/appendant information 23 (step S303).

The identical portion merging/restructuring unit 14 then performs identical portion merging/restructuring, based on the structural information/appendant information 23 (step S304). Through this identical portion merging/restructuring, merged block information 24 is obtained as intermediately generated information. The similar portion merging/restructuring unit 15 then performs similar portion merging/restructuring, based on the merged block information 24 (step S305). Through this similar portion merging/restructuring, abstracted code information 25 is obtained as intermediately generated information. Details of the macroblocking analysis, the junction node restructuring, the identical portion merging/restructuring, and the similar portion merging/restructuring will be described later.

The intermediate language restructuring unit 16 then performs intermediate language restructuring, based on the abstracted code information 25 and the syntax analysis information 22 (step S306). At the intermediate language restructuring, comprehensive restructuring and information arrangement are performed on intermediate languages generated by the processes at steps S301 to S305. Additionally, at the intermediate language restructuring, a source code may be output by a process interlocked with a preprocessor function, based on the restructured intermediate languages. Thus, module information 26 resulting from analysis of the source code 21 and a common portion module 27 made reusable through commonization are obtained as information of a componentized source code and a commonized component.

Figures 4, 5:
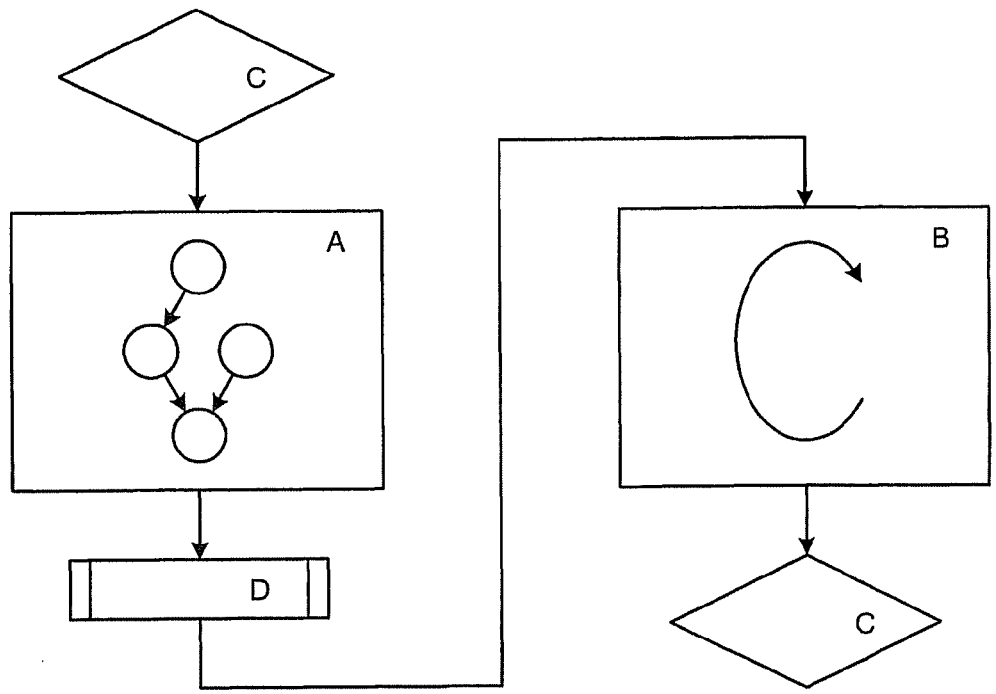
FIG. 4 is a diagram depicting items classified at macroblocking analysis.
FIG. 5 is a diagram depicting an example of a program that is segmented based on a classification table depicted in FIG. 4.

At the macroblocking analysis, the macroblocking analyzing unit 12 performs blocking segmentation, which is performed by a compiler for ordinary parallel processing. FIG. 4 is a diagram depicting items classified at the macroblocking analysis. As depicted in FIG. 4, a program is typically classified into calculation substitution process (A), loop (B), conditional branch (C), and nonconditional jump (D). The calculation substitution process (A) is expressed as an ordinary equation in the source code. The nonconditional jump (D) is expressed as a subroutine call in the source code.

FIG. 5 is a diagram depicting an example of a program that is segmented based on the classification table of FIG. 4. Alphabetical characters (A, B, C, and D) in the segmented blocks correspond to alphabetical characters in the left column of the classification table of FIG. 4, respectively. FIG. 5 depicts an example of segmentation, and no limit is set to the order and number of appearances of the calculation substitution process (A), loop (B), conditional branch (C), and nonconditional jump (D).

Figure 6:
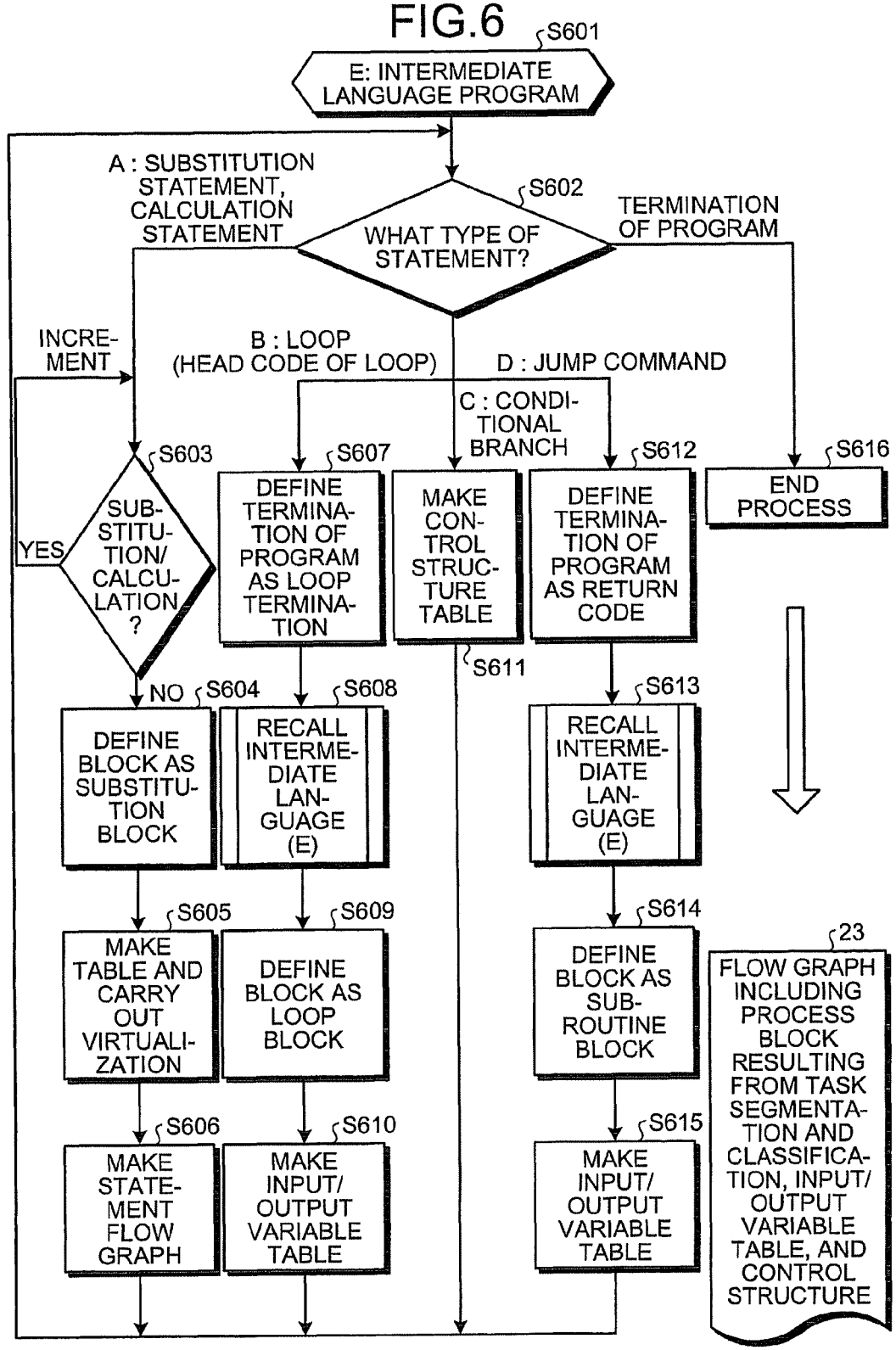
FIG. 6 is a flowchart of a macroblocking analyzing process.

FIG. 6 is a flowchart of a macroblocking analyzing process. As depicted in FIG. 6, when the macroblocking analyzing process is started by the macroblocking analyzing unit 12, an intermediate language program (E) obtained as the syntax analysis information 22 is prepared (step S601). The intermediate language program (E) is then read in line by line. When the type of a statement is substitution statement or calculation statement (step S602: A), steps S603 to S606 are performed.

While a description of a substitution statement or a calculation statement continues (step S603: YES), the lines are read forward one by one. When a block including a series of substitution or calculation statements ends (step S603: NO), the block is defined as a substitution block (step S604). Subsequently, a table is generated to perform a virtualizing process of virtualizing a statement variable (step S605). Details of the virtualizing process will be described later. A statement flow graph is generated (step S606), and the process flow returns to step S602.

When the type of a statement of the intermediate language program (E) is a loop (step S602: B), steps S607 to S610 are performed. When the type of a statement is a loop, the head code of the loop is written in the line of the statement. The termination of the program is defined as a loop termination (step S607), the intermediate language program (E) is called up again (step S608), and the block is defined as a loop block (step S609).

The reason for recalling the intermediate language program (E) at step S608 is that another loop block may be present in the loop block. An input/output variable table is then generated (step S610), after which the process flow returns to step S602. When the type of a statement of the intermediate language program (E) is a conditional branch (step S602: C), a control structure table is generated (step S611), after which the process flow returns to step S602.

When the type of a statement of the intermediate language program (E) is a jump command (D at step S602), steps S612 to S615 are performed. The termination of the program is defined as a return code (step S612), the intermediate language program (E) is called up again (step S613), and the block is defined as a subroutine block (step S614). The reason for recalling the intermediate language program (E) at step S613 is that another subroutine block may be present in the subroutine block. An input/output variable table is then generated (step S615), after which the process flow returns to step S602.

When a statement of the intermediate language program (E) represents the termination of the program at step S602, the process is ended (step S616). Hence, a flow graph including a process block resulting from task segmentation and classification, an input/output table, and a control structure is obtained as the structural information/appendant information 23.

The variable virtualizing process is performed to facilitate structural comparison in a subsequent process, by extending an intermediate language expression of a statement in usual structural analysis in the following manner. For example, when an expression represented by equation 1 is made in a source code, a fixed number is assigned to each variable, as depicted in equations 2 to 4, in an ordinary intermediate language expression.

$$A = b + c + 1 \quad (1)$$

$$V0 \leftarrow V5 + V2 \quad (2)$$

$$V3 \leftarrow V11 + C1 \quad (3)$$

$$V4 \leftarrow V3 \quad (4)$$

At this time, when a similar calculation/substitution expression represented by equation 5 is made, an intermediate language represented by equations 6 to 8 is generated. Reference numeral X, m, and n have already appeared in the source code, and numbers are assigned to X, m, and n in an intermediate language expression. In this case, simply comparing the equations 6 to 8 with the equations 2 to 4 is difficult.

$$X = m + n + 1 \quad (5)$$

$$V11 \leftarrow V5 + V6 \quad (6)$$

$$V12 \leftarrow V11 + C1 \quad (7)$$

$$V8 \leftarrow V12 \quad (8)$$

In the embodiment, a number assigned as a subscript to "V (variable)" denoting a variable is expressed by a combination of a lower portion representing a number unique in the entire source code (which is equivalent to a conventional expression) and an upper portion made up of a virtual portion representing a number unique in the statement. The subscript number is thus virtualized. For example, when a 16-bit expression is adopted in a variable table, the 16-bit expression is extended to 32-bit expression. Hence, lower 16 bits are defined as a number unique in an intermediate language expression (conventional expression) while upper 16 bits are defined as a number unique in the statement.

As a result of this virtualization, equations 2 to 4 are expressed by equations 9 to 11, and equations 6 to 8 are expressed by equations 12 to 14. In the equations 9 to 14, parenthesized values in { } are virtualized relative numbers occupying upper 16 bits.

$$V\{00\}00 \leftarrow V\{01\}01 + V\{02\}02 \quad (9)$$

$$V\{03\}03 \leftarrow V\{00\}00 + C\{01\}01 \quad (10)$$

$$V\{04\}04 \leftarrow V\{03\}03 \quad (11)$$

$$V\{00\}11 \leftarrow V\{01\}05 + V\{02\}06 \quad (12)$$

$$V\{03\}12 \leftarrow V\{00\}11 + C\{01\}01 \quad (13)$$

$$V\{04\}08 \leftarrow V\{03\}12 \quad (14)$$

In equations 9 to 14, masking of the lower 16 bits of subscripts to V and C with reference only to the upper 16 bits of the subscripts reveals that the equations 9 to 11 are identical to equations 12 to 14. In the macroblocking analyzing process, block configuration by macrotasking and the intermediate expression of an extended statement graph expression written in intermediate language are obtained as the structural information/appendant information 23. When usual syntax analysis and dependent analysis are performed, the upper 16 bits of subscripts to V and C are masked to refer only to the lower 16 bits.

Figure 7:
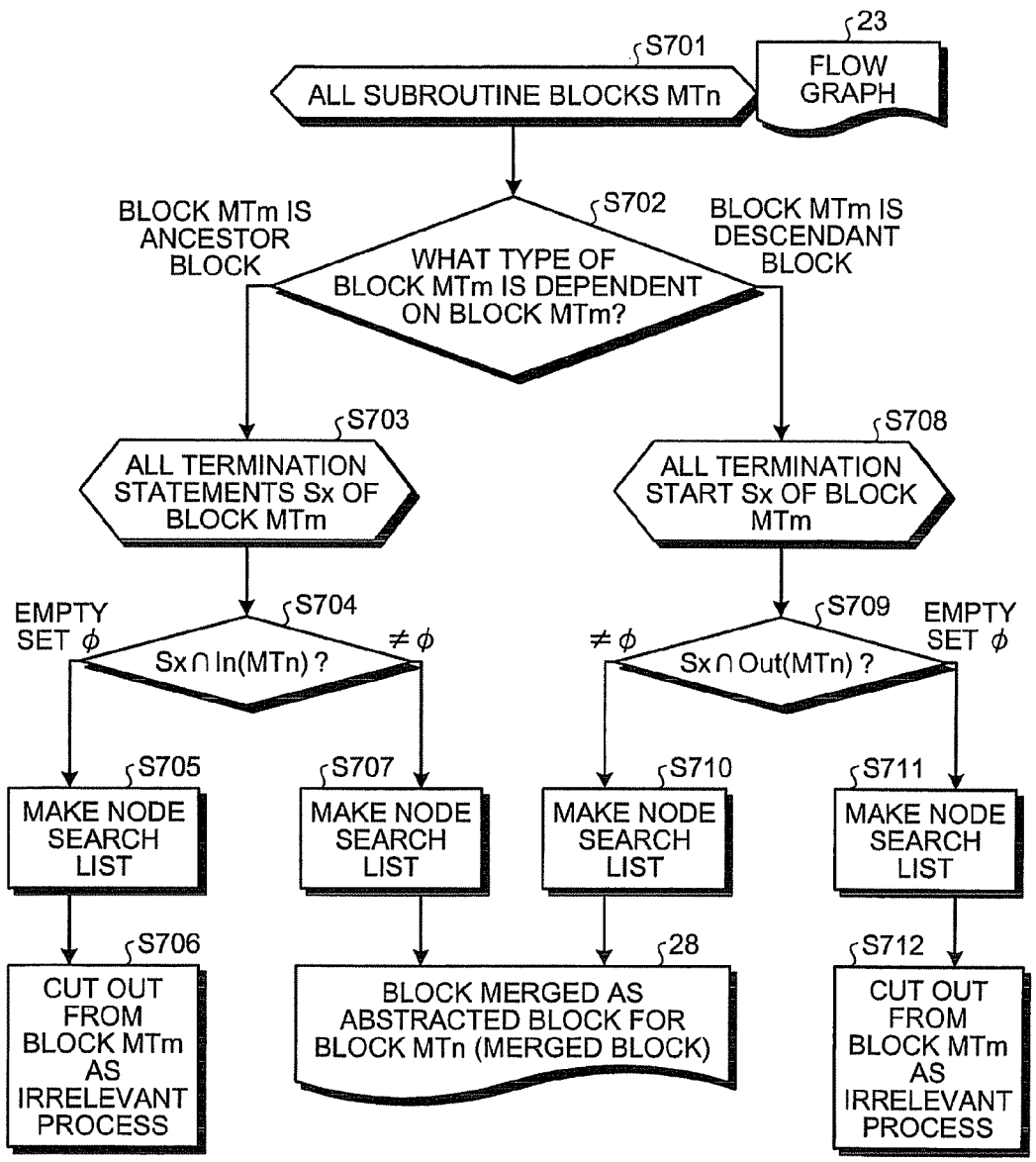
FIG. 7 is a flowchart of a junction node restructuring process.

FIG. 7 is a flowchart of a junction node restructuring process. As depicted in FIG. 7, when the junction node restructuring process is started by the junction-node restructuring unit 13, attention is paid to a subroutine block MTn, based on a flow graph obtained as the structural information/appendant information 23 (step S701).

Subsequently, the dependent relation between the subroutine block MTn and another subroutine block MTm dependent on the subroutine block MTn is determined (step S702). An ancestor block and a descendant block of the subroutine block MTn have been generated at the above macroblocking analyzing.

When the subroutine block MTm is an ancestor block (ancestor block at step S702), all termination statements Sx of the subroutine block MTm are the subject of focus (step S703). A determination is then made concerning a set of intersection (Sx∩In(MTn)) of a set of variables defined in the termination statements Sx and a set of variables used in the subroutine block MTn (step S704).

When the set of intersection is the empty set Ø (step S704: Ø), a statement graph search (node search) is performed on nodes in the block MTm in the reverse direction from the subroutine block MTn of focus at step S701, and a list is generated (step S705). A node found in the search at step S705 is cut out from the block MTm as a node at which a process irrelevant to the subroutine block MTn is executed (step S706).

When the set of intersection (Sx∩In(MTn)) is not the empty set Ø (step S704: ≠Ø), a node search is performed on nodes in the block MTm in the reverse direction from the subroutine block MTn of focus at step S701, and a list of nodes directly dependent on the subroutine block MTn is made (step S707). When the block MTm is a descendant block at step S702 (descendant block at step S702), attention is paid to all start statements Sx of the block MTm (step S708).

A determination is then made concerning a set of intersection (Sx∩out(MTn)) of a set of variables used in the start statements Sx and a set of variables defined in the subroutine block MTn (step S709). When the set of intersection is not the empty set Ø (step S709: ≠Ø), a node search is performed on nodes in the block MTm in the forward direction from the subroutine block MTn of focus at step S701, and a list of nodes on which the subroutine block MTn is directly dependent is made (step S710).

When the set of intersection is the empty set Ø at step S709 (step S709: Ø), a statement graph search (node search) is performed on nodes in the block MTm in the forward direction from the subroutine block MTn of focus at step S701, and a list is generated (step S711). A node found in the search at step S711 is cut out from the block MTm as a node at which a process irrelevant to the subroutine block MTn is executed (step S712).

The processes at steps S701 to S712 are performed on all subroutine blocks MTn, thereby producing a block 28 (hereinafter "merged block") as an abstracted block for the subroutine block MTn and that is a result of merging the subroutine block MTn, a group of nodes extracted from an ancestor block at step S707, and a group of nodes extracted from a descendant block at step S710 into the abstracted block. Reference characters MT denotes macrotask.

Figure 8:
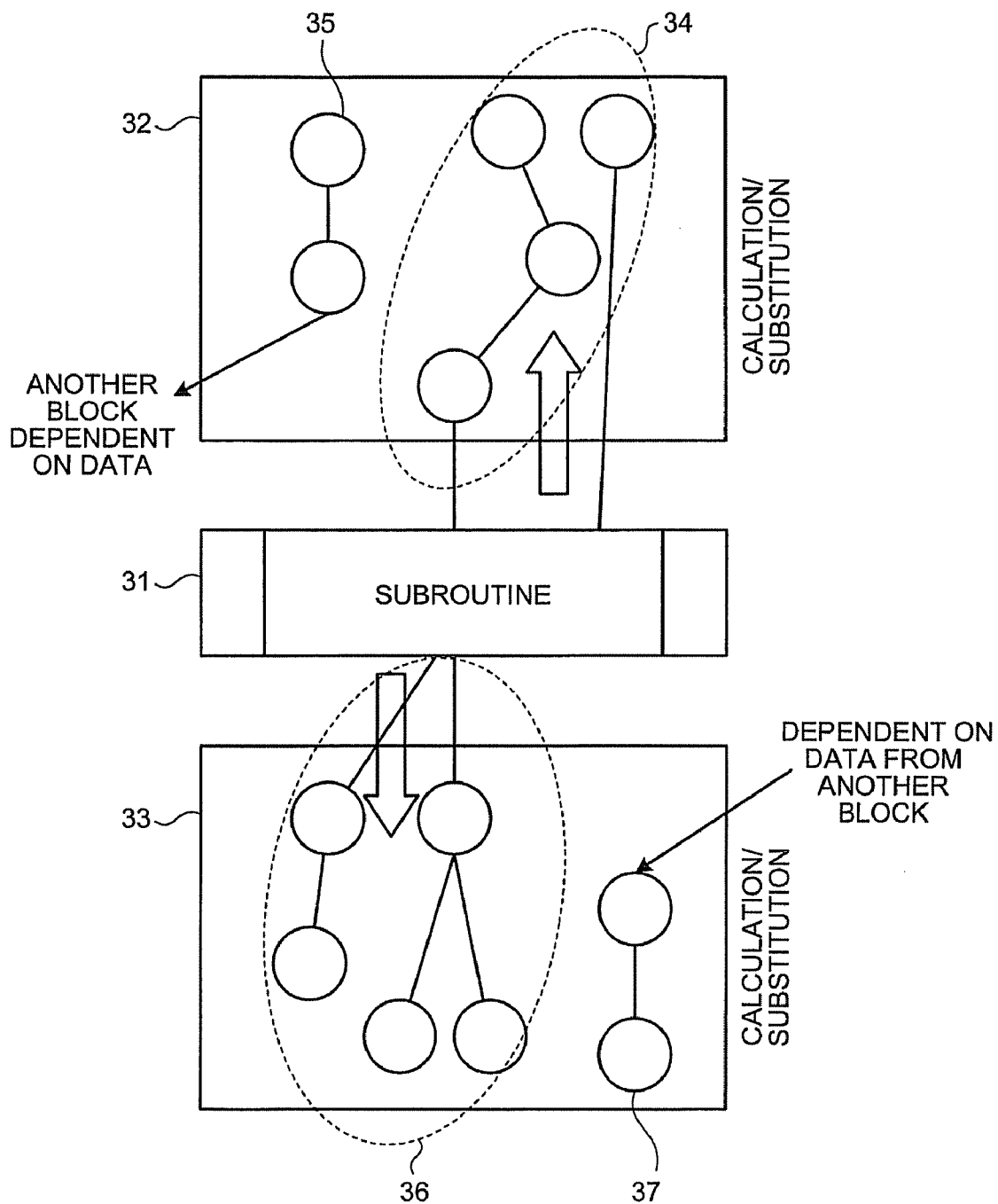
FIGS. 8 and 9 are explanatory diagrams of the junction node restructuring process.
Figure 9:
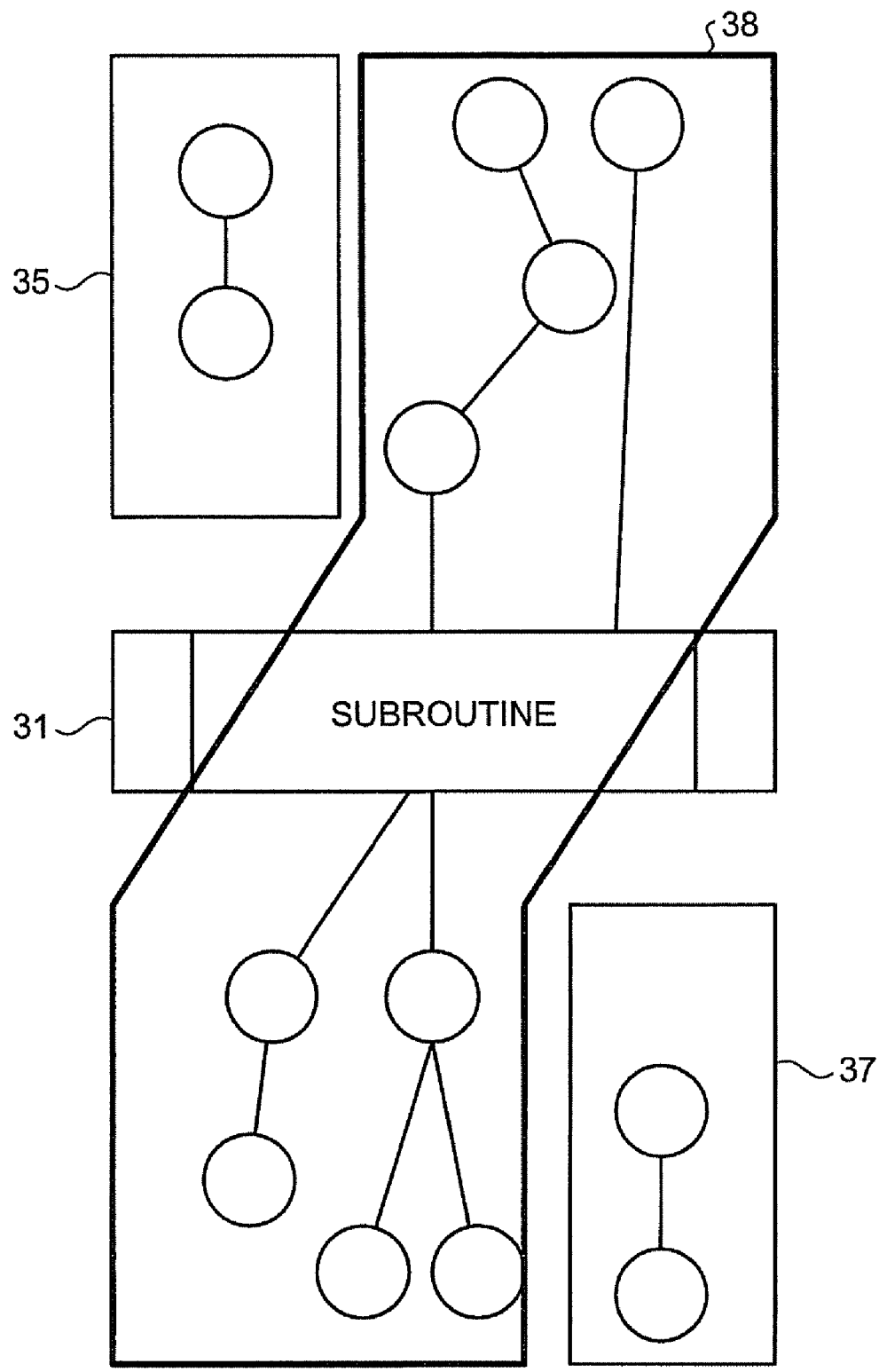

FIGS. 8 and 9 are explanatory diagrams of the junction node restructuring process. As depicted in FIGS. 8 and 9, reference numeral 31 denotes a subroutine block, reference numeral 32 denotes an ancestor block, and reference numeral 33 denotes a descendant block. The subroutine block 31 is directly dependent on a node group 34 encircled with a dotted line in the ancestor block 32. A node group 35 on which another block is dependent is cut out from the ancestor block 32 as nodes at which a process irrelevant to the subroutine block 31 is executed.

In the descendant block 33, a node group 36 encircled with a dotted line is a node group directly dependent on the subroutine block 31. A node group 37 dependent on another block is cut out from the descendant block 33 as nodes at which a process irrelevant to the subroutine block 31 is executed. Hence, in the case of the configuration depicted in FIG. 8, a merged block 38 encircled with a thick continuous line is created, as depicted in FIG. 9.

In an ordinary program, a subroutine may be called up at multiple places. At the identical portion merging/restructuring, the identical portion merging/restructuring unit 14 compares, based on information of the merged block 28 obtained by the above junction node restructuring process, junction nodes on identical subroutine blocks called up at multiple places in the program to further merge identical or similar merged blocks.

When merging, the identical portion merging/restructuring unit 14 refers only to, for example, the upper 16 bits (virtual portion) of a subscript to a variable that is extended by the virtualizing process of virtualizing a statement variable. In a case of an ordinary program expression, comparing the identicalness of nodes joined to a subroutine block is difficult. In this embodiment, however, by comparing virtual portions of subscripts to be compared, an identical portion can be extracted easily even if the identical portion is expressed as different portions in the program.

Figure 10:
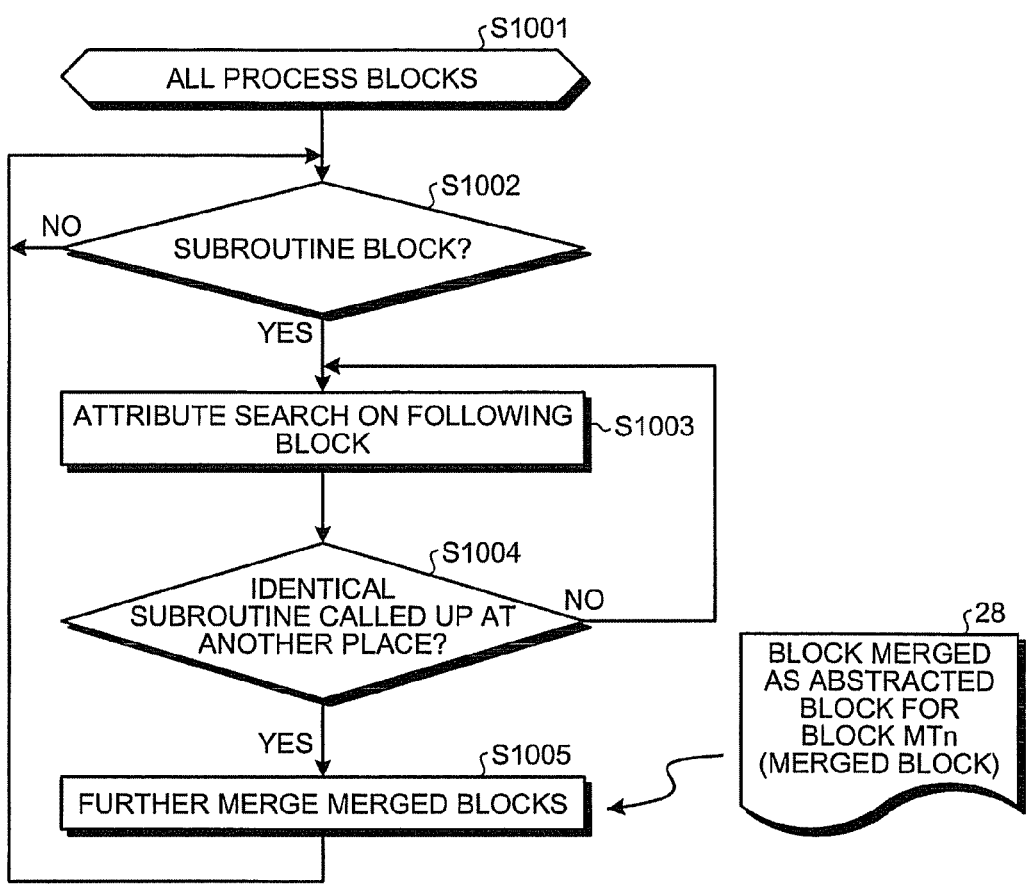
FIG. 10 is a flowchart of an identical portion merging/restructuring process.

FIG. 10 is a flowchart of an identical portion merging/restructuring process. As depicted in FIG. 10, when the identical portion merging/restructuring process is started by the identical portion merging/restructuring unit 14, all process blocks are prepared (step S1001). The process blocks are read in one by one, and whether a read block is a subroutine block is determined (step S1002). When the read block is not a subroutine block (step S1002: NO), the next process block is processed.

When the read block is a subroutine block (step S1002: YES), an attribute search on the block following the read block is performed (step S1003) to determine whether the read process block is the same subroutine that is called up at another place in the same application program (step S1004). When the read process block is the same subroutine (step S1004: YES), merged blocks are further merged (step S1005), after which the process flow returns to step S1002. When the read process block is not the same subroutine (S1004: NO), the process flow returns to step S1003.

Figure 11:
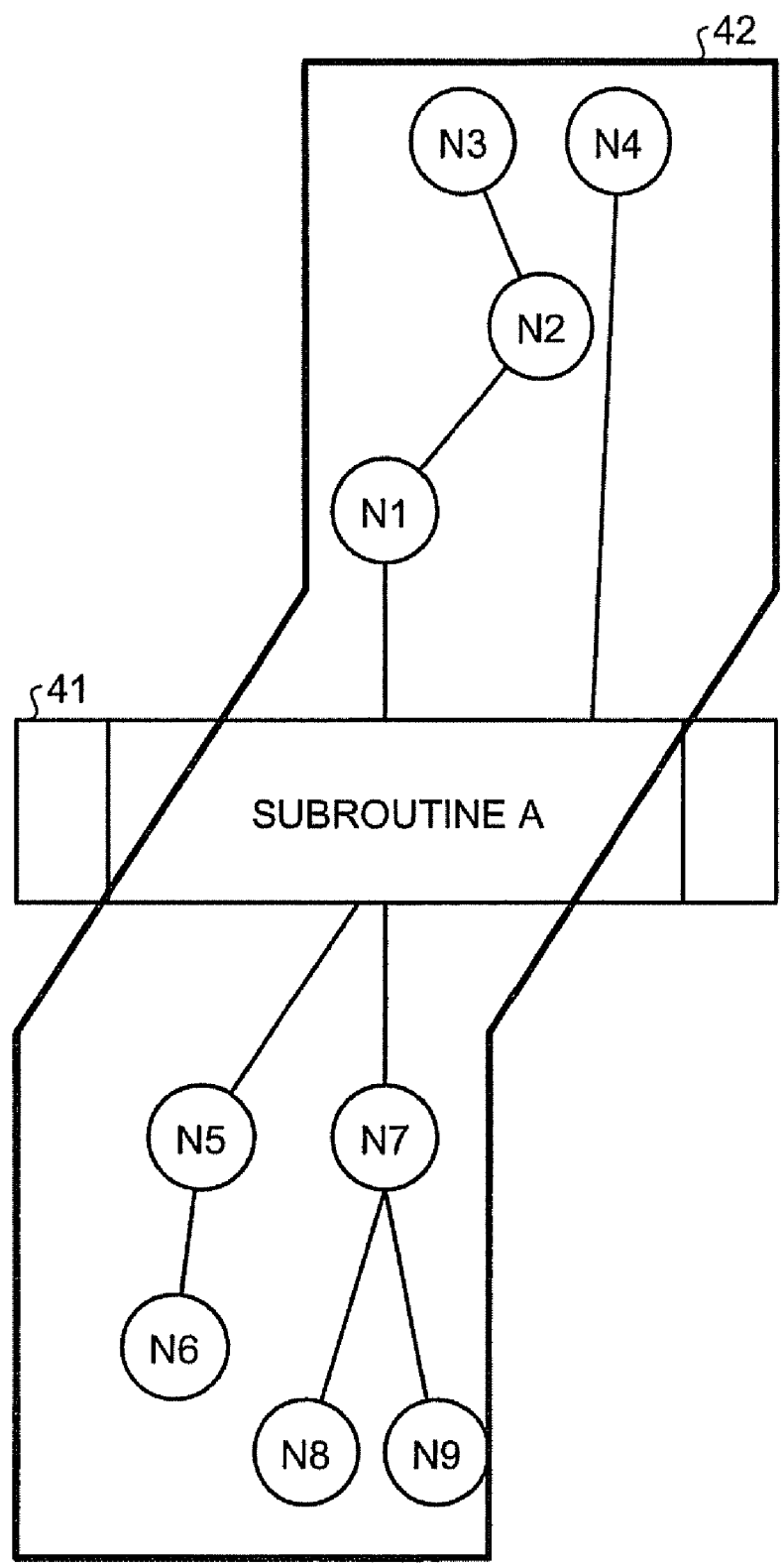
FIGS. 11 to 13 are explanatory diagrams of the identical portion merging/restructuring process.
Figure 12:
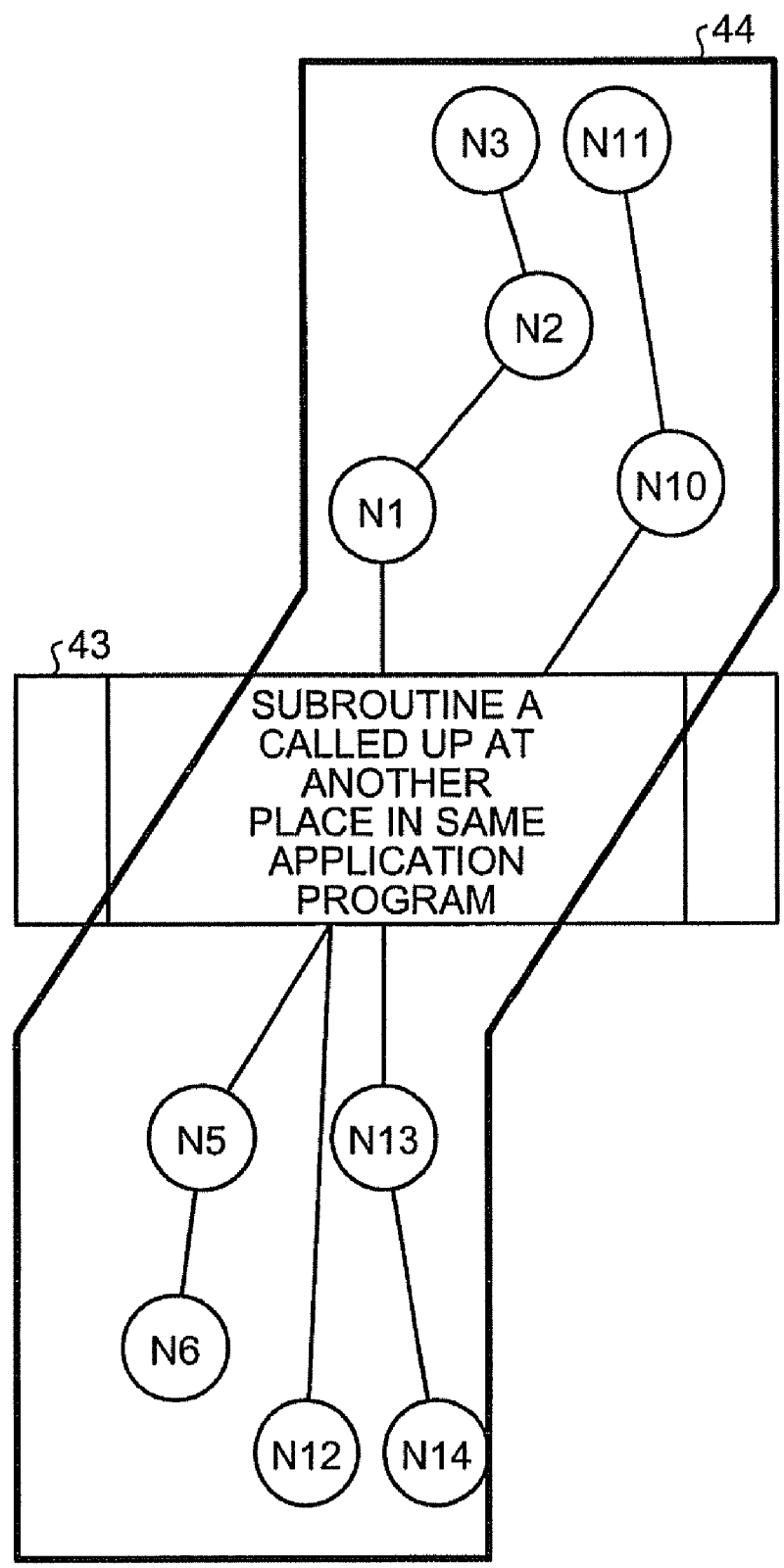
Figure 13:
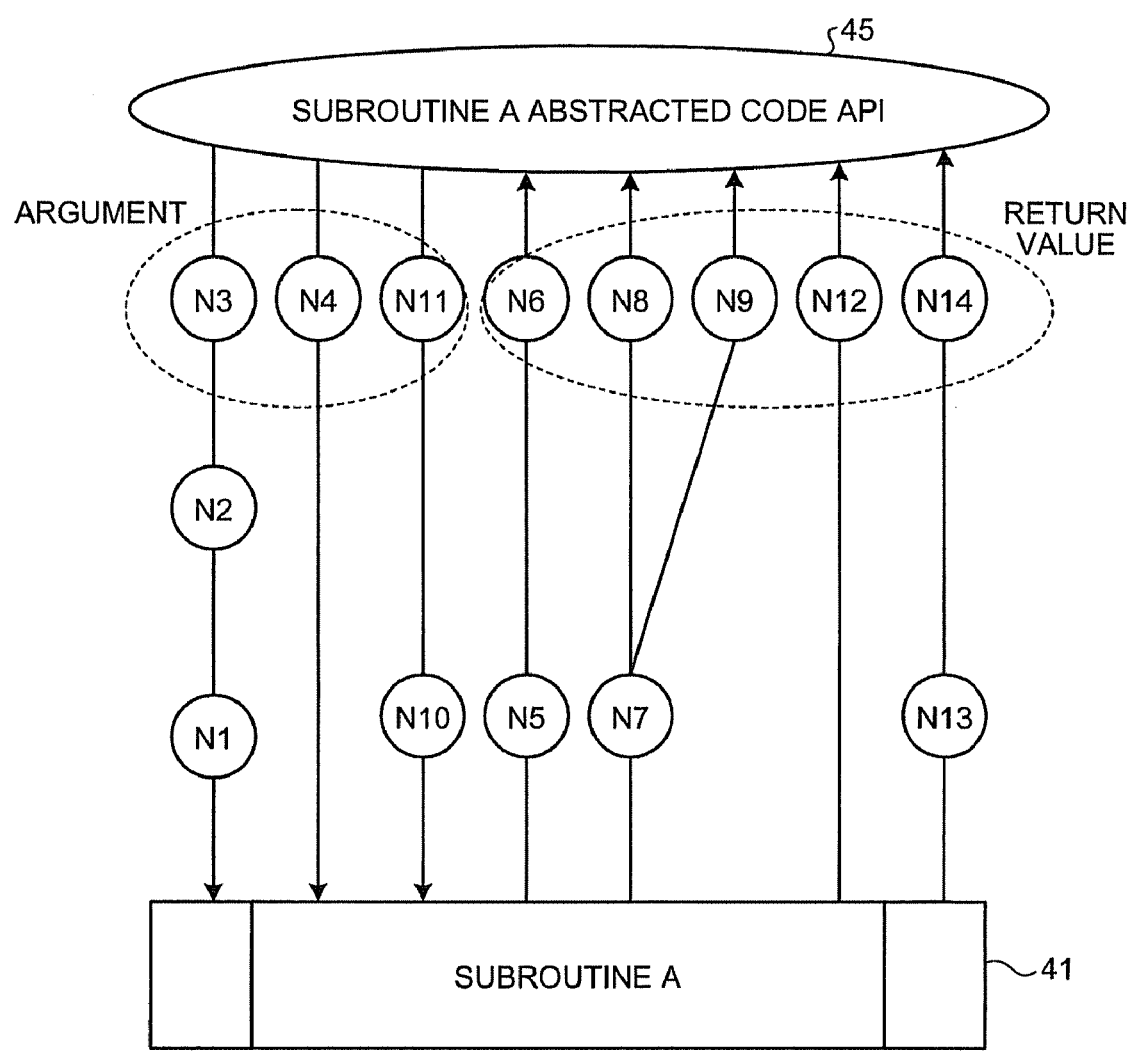

FIGS. 11 to 13 are explanatory diagrams of the identical portion merging/restructuring process. In FIG. 11, reference numeral 41 denotes a subroutine A block and reference numeral 42 denotes a merged block for the subroutine A block. In the merged block 42, the ancestor block side includes a node group including a node N1, a node N2, and a node N3 that run in the reverse direction in increasing order and a node N4, while the descendant block side includes a node group including a node N5 and a node N6 that run in the forward direction in increasing order, a node group including a node N7 and a node N8 that run in the forward direction in increasing order, and a node group including the node N7 and a node N9 that run in the forward direction in increasing order. The nodes 8 and 9 branch from the node N7.

In FIG. 12, reference numeral 43 denotes the subroutine A block called up at another place in the same application program, and reference numeral 44 denotes a merged block for the subroutine A block. In the merged block 44, the ancestor block side includes a node group including the node N1, the node N2, and the node N3 that run in the reverse direction in increasing order and a node group including a node N10 and a node N11 that run in the reverse direction in increasing order. The descendant block side in the merged block 44 includes a node group including the node N5 and the node N6 that run in the forward direction in increasing order, a node N12, and a node group including a node N13 and a node 14 that run in the forward direction in increasing order.

In this case, when the merged block 42 for the subroutine A block 41 is merged with the merged block 44 for the subroutine A block 43 that is called up at another place in the same application program, a subroutine A abstracted code Application Program Interface (API) 45 is obtained, which has arguments of the nodes N3, N4, and N11 and return values of the nodes N6, N8, N9, N12, and N14, as depicted in FIG. 13. In this manner, the program is expressed more simply by merging nodes that are joined ultimately to the same subroutine block.

In general, when a given subroutine block is called up at multiple places in the program, the fact that a pre-processing (ancestor block process) and a post-processing (descendant block process) on the subroutine block are identical at each place may not be clearly described in the document. In such a case, it is difficult for the developer to extract the pre-processing (ancestor block process) and the post-processing (descendant block process) as the same process at multiple places.

In this embodiment, however, through extension of a subscript to a statement variable, a general-purpose lapping code (abstracted code) for the pre-processing and the post-processing of a subroutine of focus can be generated easily. Identical nodes in the source code are thus integrated to reduce the size of the source code.

Figure 14:
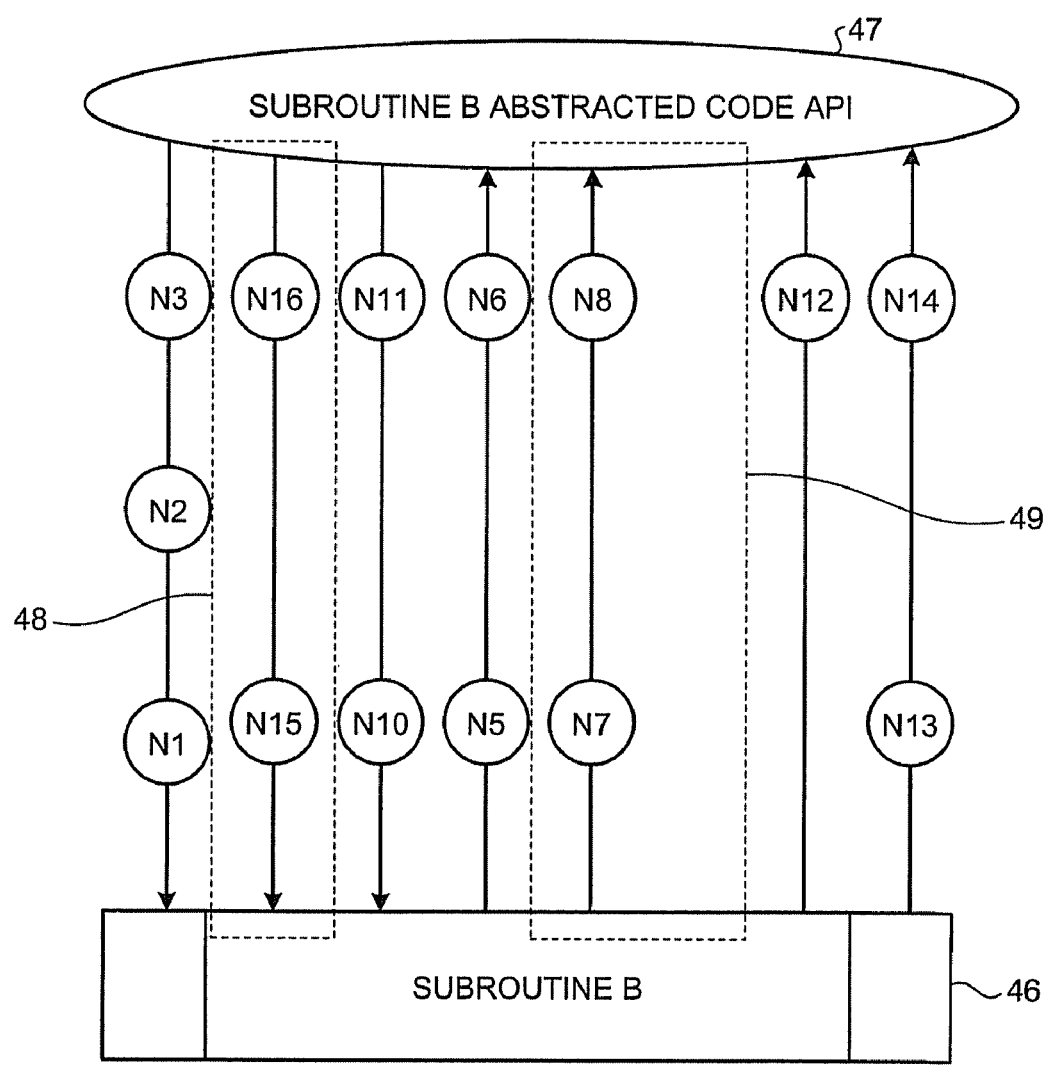
FIGS. 14 and 15 are explanatory diagrams of a similar portion merging/restructuring process.
Figure 15:
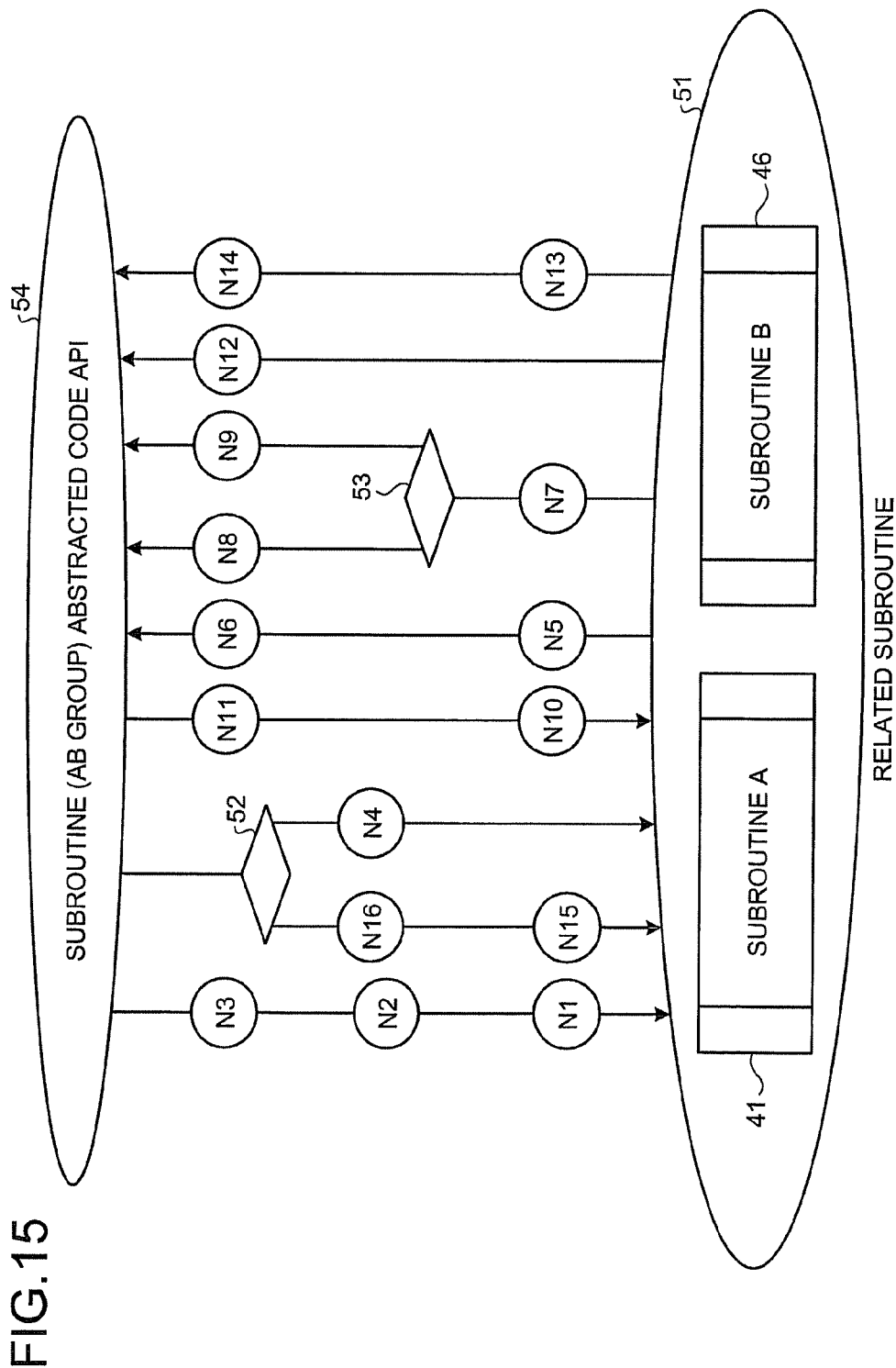

FIGS. 14 and 15 are explanatory diagrams of a similar portion merging/restructuring process. In FIG. 14, reference numeral 46 denotes a subroutine B block, and reference numeral 47 denotes a subroutine B abstracted code API for the subroutine B block. Pre-processing and post-processing of the subroutine B block 46 are different from the pre-processing and post-processing of the subroutine A block 41 of FIG. 13 in the following two respects.

First, in FIG. 14, a node group 48 including a node N15 and a node N16 that is encircled with a dotted line is present in place of the node N4. Secondly, a node group 49 encircled with a dotted line in FIG. 14 does not include the node N9 branching from the node N7. Thus, similar pre-processing and post-processing may be performed with respect to a different subroutine.

In a specific example, pre-processing and post-processing of moving picture processing are performed on moving picture processing subroutines, such as Moving Picture Experts Group (MPEG-1, MPEG-2, and MPEG-4). In this case, pre-processing on an image frame buffer for image output and post-processing of filtering after image output are performed as common processing.

The similar portion merging/restructuring unit 15 automatically extracts such similarities between program components. In extracting a similarity, the similar portion merging/restructuring unit 15 compares virtual portions of subscripts of variables to be compared, and recognizes the program components to be the same if the program components are expressed as different components on the source code but have an identical calculation structure.

The similar portion merging/restructuring unit 15 merges lapping codes for grouped blocks (abstracted blocks). When merging lapping codes, the similar portion merging/restructuring unit 15 regards node groups identical in node connection relation to be the same node group, thus merging the node groups into a single node group. Branch processing is inserted in node groups partially identical in node connection relation to further merge node groups.

For example, in the case of FIGS. 13 and 14, the similar portion merging/restructuring unit 15 merges the subroutine A block 41 and the subroutine B block 46 into an related subroutine 51, as depicted in FIG. 15. The similar portion merging/restructuring unit 15 then inserts branch processing 52 so that the flow of processing goes through the node N4 when the subroutine A is used and goes through the nodes N15 and N16 when the subroutine B is used.

The similar portion merging/restructuring unit 15 also inserts branch processing 53 so that the flow of processing goes through the node N7 and the node N8 or node N9 branching from the node N7 when the subroutine A is used and goes through the nodes N7 and N8 when the subroutine B is used. As a result, a subroutine (AB group) abstracted code API 54 is obtained as an abstracted code API for the related subroutine 51.

Figure 16:
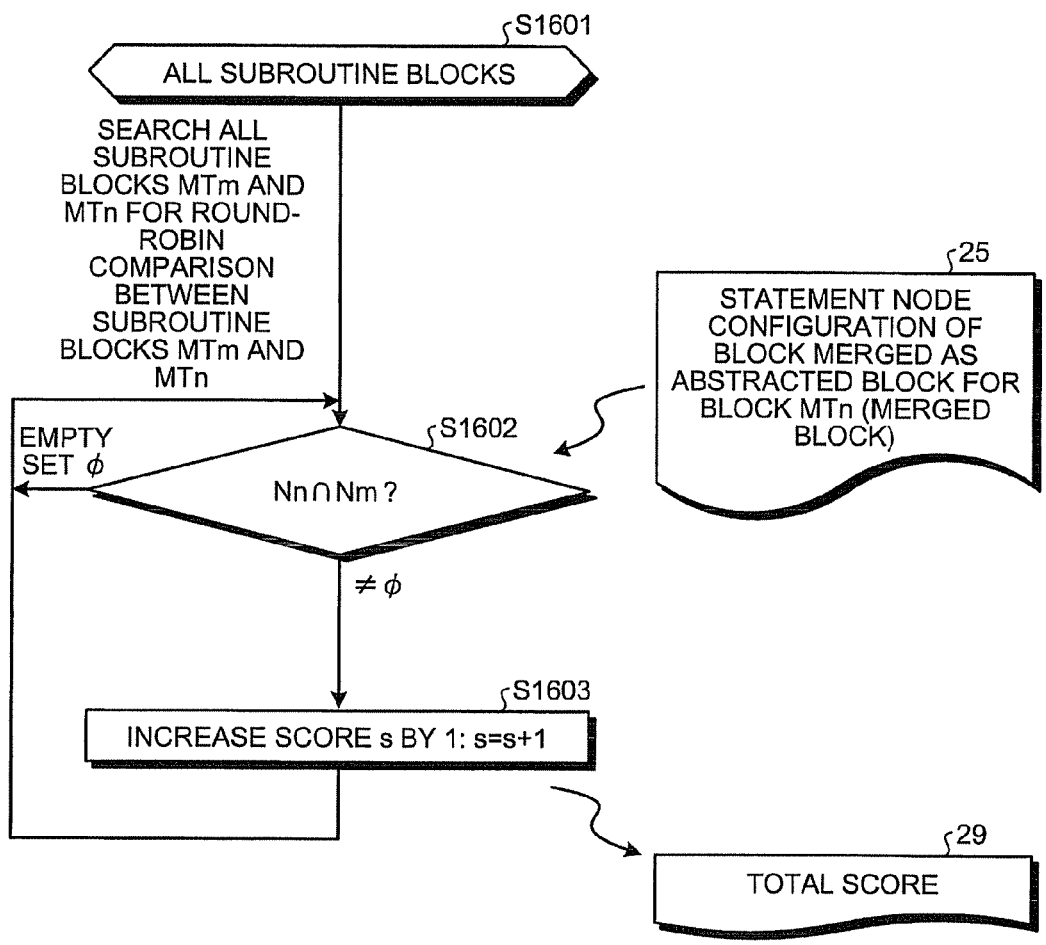
FIG. 16 is a flowchart of the similar portion merging/restructuring process.

FIG. 16 is a flowchart of the similar portion merging/restructuring process. As depicted in FIG. 16, when the similar portion merging/restructuring process is started by the similar portion merging/restructuring unit 15, all subroutine blocks are prepared (step S1601). Based on the statement node configuration of a merged block that is obtained as the abstracted code information 25, an abstracted block for a given subroutine block MTn is a subject of focus, and a set of statement nodes included in the abstracted block is expressed as Nn.

Likewise, an abstracted block for another subroutine block MTm as a subroutine block to be compared with the subroutine block MTn becomes a subject of focus, and a set of statement nodes included in the abstracted block is expressed as Nm. A determination is then made concerning a set of intersection (Nn∩Nm) of the set Nn and the set Nm (step S1602). When the set of intersection of the set Nn and the set Nm is not a empty set Ø (step S1602: ≠Ø), a score s is increased by 1 (step S1603).

When comparison of all statement nodes has been completed for a combination of the subroutine block MTn and the subroutine block MTm, a total score 29 is obtained. When the set of intersection (Nn∩Nm) is the empty set Ø at step S1602 (step S1602: Ø), the same comparison is performed between the subroutine block MTn and still another subroutine block MTm. The above process is performed between all subroutine blocks.

A threshold for the total score is set in advance according to a requirement for a development environment to be incorporated. A combination of subroutine blocks that give a total score equal to or larger than the threshold are grouped into a related subroutine. It is confirmed from the past experience that a desired effect is achieved by grouping subroutines that give the total score of at least 1, i.e., that have at least one substitution/calculation node equivalent to the identical pre-processing or post-processing.

In this manner, identical nodes in subroutine blocks different from each other are merged to reduce the size of the source code. By this similar portion merging/restructuring process, a subroutine dependent on a hardware specification can be extracted from among subroutines classified as similar blocks.

For example, when a classified subroutine is a device driver, a lapping code (abstracted code) equivalent to pre-processing or post-processing of the subroutine conceals a hardware-dependent difference from a block that calls a lapping code from an upper layer, against a code for the device driver. In other words, a merged lapping code resulting from the similar portion merging/restructuring process works in the same manner as a lapping code for an ordinary device driver.

According to the embodiment, when the identicalness of nodes is determined at the identical portion merging/restructuring and the similar portion merging/restructuring, extension of a subscript to a statement variable facilitates the determination concerning the identicalness of the nodes. This allows a computer to automatically extract identical or similar blocks. As a result, a reusable module can be generated automatically by the computer from an existing resource without depending on the manual work of the developer.

Multiple source codes may be input as the source codes 21. In this case, the identicalness of nodes is determined for the multiple source codes at the identical portion merging/restructuring and the similar portion merging/restructuring. The input of multiple source codes enables a component to be obtained that can be used commonly for the codes, offering a greater effect.

Figure 17:
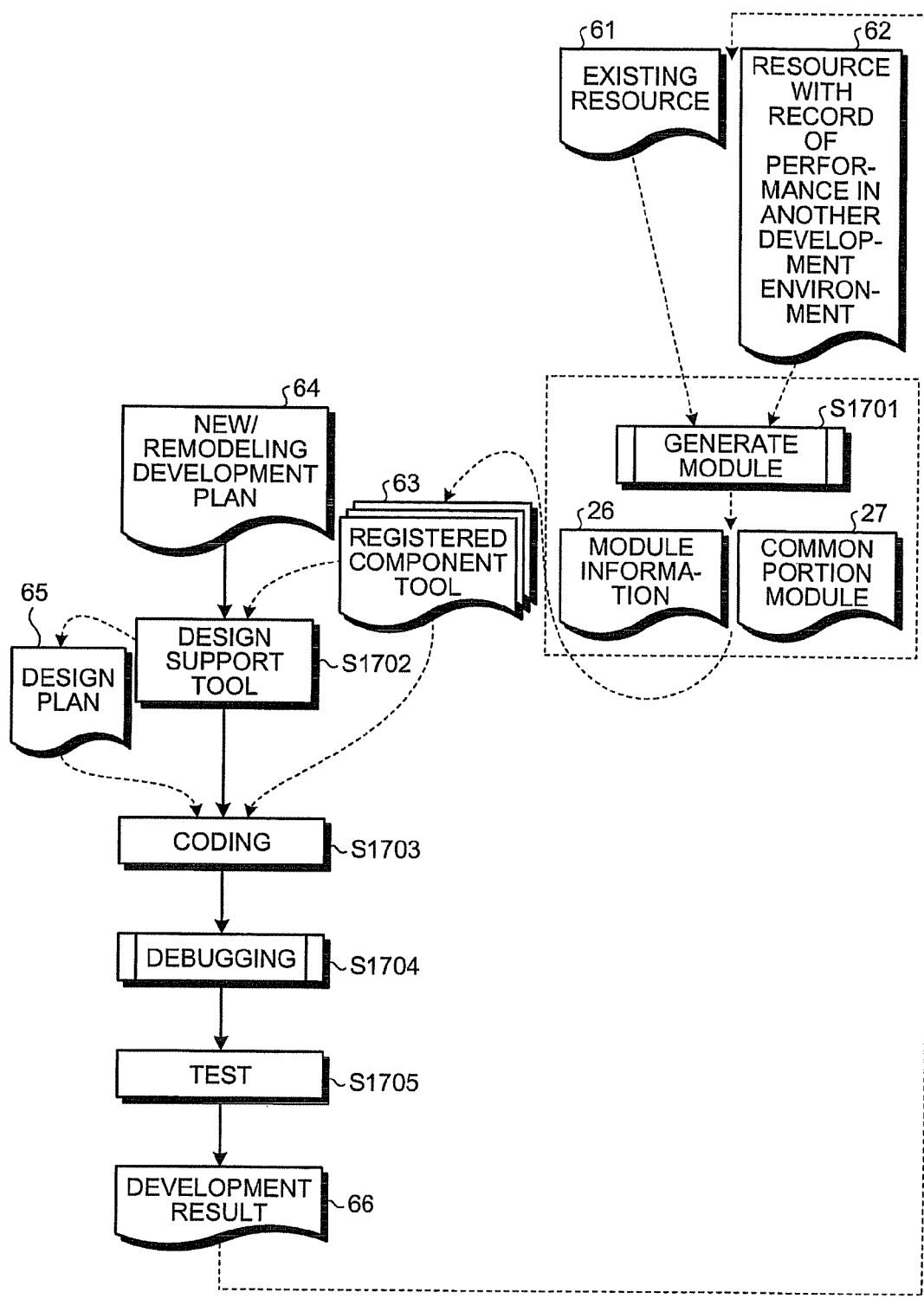
FIG. 17 is a flowchart of a software development process to which the above module generating process is applied.

FIG. 17 is a flowchart of a software development process to which the above module generating process is applied. As depicted in FIG. 17, module information 26 and a common portion module 27 are obtained ultimately from an existing resource 61 and a resource 62 with a performance record in another development environment, by the module generating process (step S1701), and the obtained information is incorporated, as a registered component tool 63, into an existing development environment. The developer does not have to develop unnecessary code, but reuses a component mechanically extracted from an existing code to make a design plan 65 from a new/modification development plan 64, using a design support tool (step S1702), and then performs a coding process (step S1703).

Subsequently, a debugging process (step S1704) and a test (step S1705) are performed to obtain a development result 66. As a result, trouble and time spent for debugging and testing in post-processing can be saved. The development result 66 is reused as the subject of the module generating process. In this manner, processes to be manually executed by the developer are reduced to the coding process only, so that the period for software development is reduced.

To examine a degree of an effect achieved by the embodiment, the inventor developed application programs for a monitoring camera system, a TV phone system, and a multimedia reproduction system. The monitoring camera system was developed first according to a conventional development process. In this development, one case of a bug was detected from a source code made up of 100 lines, at debugging and testing.

When source code analysis was performed on the development result of the monitoring camera system through the module generating process, some 100 types of blocks were extracted. When the TV phone system was developed using the extracted blocks, one case of a bug was detected from a source code made up of 600 lines. The development result of the monitoring camera system and the development result of the TV phone system includes common codes making up 80% of the entire code.

When source code analysis was performed on the development result of the monitoring camera system and the development result of the TV phone system according to the module generating process to develop the multimedia reproduction system using the result of the analysis, one case of a bug was detected from a source code made up of 1,000 lines. The development results of three systems include common codes making up 60% of the entire code.

Subsequently, when source code analysis was performed on the development results of three systems through the module generating process to develop a new system by adding another function to the multimedia reproduction system using the result of the analysis, one case of a bug was detected from a source code made up of 5,000 lines. The development result of this new system includes common codes making up 90% of the entire code.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A module generating apparatus comprising:
    a parsing unit that, by a processor, performs syntax analysis of a source code for a program and outputs information concerning the syntax analysis;
    a macroblocking analyzing unit that based on syntax analysis information output from the parsing unit, segments the program into a plurality of blocks through structural analysis of the program and outputs block structure information obtained as a result of the segmentation and appendant information for virtualizing a calculation pattern of each block;
    a junction-node restructuring unit that based on the block structure information and the appendant information output from the macroblocking analyzing unit, focuses on one block, defined as a subroutine, extracts a node directly related to the block of focus by tracing back a processing sequence to a node that is in an ancestor block upstream in the processing sequence from the block of focus and from which the block of focus is reached as a result of sequential processing, and by tracing the processing sequence to a node that is in a descendant block downstream in the processing sequence from the block of focus and that is processed after the block of focus;
    an identical portion merging/restructuring unit that, with respect to a plurality of portions that use the block of focus extracted from the program by the junction-node restructuring unit, compares nodes in ancestor blocks of the block of focus to merge the ancestor blocks, compares nodes in descendant blocks of the block of focus to merge the descendant blocks, and outputs merged-block information obtained as a result of merging the ancestor blocks and merging the descendant blocks;
    a similar portion merging/restructuring unit that with respect to a second block of focus extracted from the program by the junction-node restructuring unit, compares the merged-block information to define, as subroutines of an identical type, a plurality of blocks of focus that have similar or identical merged block information, further merges similar or identical merged block information, and outputs abstracted code information obtained as a result of the merging; and
    an intermediate language restructuring unit that outputs information of a commonized component, based on the abstracted code information and the syntax analysis information.

2. The module generating apparatus according to claim 1, wherein
    the macroblocking analyzing unit appends, to a number identifying a variable for a statement in each block, a virtual portion representing a number unique in the statement, the virtual portion being appended as the appendant information and to express the number for identifying the variable by a combination of a lower portion representing a number unique in the source code entirely and an upper portion made up of the virtual portion.

3. The module generating apparatus according to claim 2, wherein
    the identical portion merging/restructuring unit performs comparison between nodes in the ancestor block and between nodes in the descendant block by identifying a variable based on the virtual portion.

4. The module generating apparatus according to claim 2, wherein
    the similar portion merging/restructuring unit compares the merged block information by identifying a variable based on the virtual portion.

5. A module generating method comprising:
    parsing involving syntax analysis of a source code for a program and obtaining information concerning the syntax analysis, by using a processor;
    macroblocking-analyzing involving segmentation of the program into a plurality of blocks through structural analysis of the program based on syntax analysis information obtained from the parsing, obtaining block structure information as a result of the segmentation, and obtaining appendant information for virtualizing a calculation pattern of each block;
    commonizing a component, based on the block structure information and the appendant information.

6. The module generating method according to claim 5, wherein
    the commonizing further involves junction-node-restructuring that is based on the block structure information and the appendant information and involves focusing on one block defined as a subroutine, extracting a node directly related to the block of focus by tracing back a processing sequence to a node that is in an ancestor block upstream in the processing sequence from the block of focus and from which the block of focus is reached as a result of sequential processing, and by tracing the processing sequence to a node that is in a descendant block downstream in the processing sequence from the block of focus and that is processed after the block of focus.

7. The module generating method according to claim 6, wherein the commonizing further involves identical-portion-merging that, with respect to a plurality of portions that use the block of focus extracted from the program at the junction-node-restructuring, involves comparing nodes in ancestor blocks of the block of focus, merging the ancestor blocks, comparing nodes in descendant blocks of the block of focus, merging the descendant blocks, and obtaining merged-block information as a result of the merging of the ancestor blocks and of the descendant blocks.

8. The module generating method according to claim 7, wherein the commonizing further involves similar-portion-merging that, with respect to a second block of focus extracted from the program at the junction-node restructuring, involves comparing the merged-block information to define, as subroutines of an identical type, a plurality of blocks of focus that have similar or identical merged block information, further merging similar or identical merged block information, and obtaining abstracted code information as a result of the merging.

9. The module generating method according to claim 8, wherein the commonizing further involves intermediate-language-restructuring that obtains information concerning a commonized component, based on the abstracted code information and the syntax analysis information.

10. The module generating method according to claim 9, wherein the macroblocking-analyzing further involves appending, to a number identifying a variable for a statement in each block, a virtual portion representing a number unique in the statement, the virtual portion being appended as the appendant information and to express the number for identifying the variable by a combination of a lower portion representing a number unique in the source code entirely and an upper portion made up of the virtual portion.

11. The module generating method according to claim 10, wherein the identical-portion-merging further involves comparison between nodes in the ancestor block and between nodes in the descendant block by identifying a variable based on the virtual portion.

12. The module generating apparatus according to claim 10, wherein the similar-portion-merging further involves comparing the merged block information by identifying a variable based on the virtual portion.

13. A computer-readable recording medium storing therein a module generating program that causes a computer to execute:

parsing involving syntax analysis of a source code for a program and obtaining information concerning the syntax analysis;

macroblocking-analyzing involving segmentation of the program into a plurality of blocks through structural analysis of the program based on syntax analysis information obtained from the parsing, obtaining block structure information as a result of the segmentation, and obtaining appendant information for virtualizing a calculation pattern of each block;

junction-node-restructuring based on the block structure information and the appendant information and involving, focusing on one block defined as a subroutine, extracting a node directly related to the block of focus by tracing back a processing sequence to a node that is in an ancestor block upstream in the processing sequence from the block of focus and from which the block of focus is reached as a result of sequential processing, and by tracing the processing sequence to a node that is in a descendant block downstream in the processing sequence from the block of focus and that is processed after the block of focus;

identical-portion-merging that, with respect to a plurality of portions that use the block of focus extracted from the program at the junction-node-restructuring, involves comparing nodes in ancestor blocks of the block of focus, merging the ancestor blocks, comparing nodes in descendant blocks of the block of focus, merging the descendant blocks, and obtaining merged-block information as a result of the merging of the ancestor blocks and of the descendant blocks;

similar-portion-merging that, with respect to a second block of focus extracted from the program at the junction-node restructuring, involves comparing the merged-block information to define, as subroutines of an identical type, a plurality of blocks of focus that have similar or identical merged block information, further merging similar or identical merged block information, and obtaining abstracted code information as a result of the merging; and intermediate-language-restructuring that obtains information concerning a commonized component, based on the abstracted code information and the syntax analysis information.

14. The computer-readable recording medium according to claim 13, wherein the macroblocking-analyzing further involves appending, to a number identifying a variable for a statement in each block, a virtual portion representing a number unique in the statement, the virtual portion being appended as the appendant information and to express the number for identifying the variable by a combination of a lower portion representing a number unique in the source code entirely and an upper portion made up of the virtual portion.

15. The computer-readable recording medium according to claim 14, wherein the identical-portion-merging further involves comparison between nodes in the ancestor block and between nodes in the descendant block by identifying a variable based on the virtual portion.

16. The computer-readable recording medium according to claim 14, wherein the similar-portion-merging further involves comparing the merged block information by identifying a variable based on the virtual portion.

* * * * *